(12) United States Patent
Gomezcaballero et al.

(10) Patent No.: US 10,796,167 B2
(45) Date of Patent: Oct. 6, 2020

(54) PERIPHERY RECOGNITION DEVICE

(71) Applicant: HITACHI AUTOMOTIVE SYSTEMS, LTD., Hitachinaka-shi, Ibaraki (JP)

(72) Inventors: Felipe Gomezcaballero, Tokyo (JP); Masayuki Takemura, Tokyo (JP); Takeshi Nagasaki, Ibaraki (JP); Shouji Muramatsu, Tokyo (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/741,807

(22) PCT Filed: Aug. 5, 2016

(86) PCT No.: PCT/JP2016/073029
§ 371 (c)(1),
(2) Date: Jan. 4, 2018

(87) PCT Pub. No.: WO2017/056724
PCT Pub. Date: Apr. 6, 2017

(65) Prior Publication Data
US 2018/0197020 A1    Jul. 12, 2018

(30) Foreign Application Priority Data

Sep. 29, 2015 (JP) .................. 2015-191331

(51) Int. Cl.
*G06K 9/00* (2006.01)
*G06T 1/00* (2006.01)
(Continued)

(52) U.S. Cl.
CPC .......... *G06K 9/00791* (2013.01); *G01C 3/06* (2013.01); *G01C 3/08* (2013.01); *G01C 11/02* (2013.01);
(Continued)

(58) Field of Classification Search
CPC ........ G01C 11/02; G01C 21/265; G01C 3/06; G01C 3/08; G06K 9/00201;
(Continued)

(56) References Cited

U.S. PATENT DOCUMENTS 5,535,144 A    7/1996 Kise
8,654,196 B2*  2/2014 Yokota ................... H04N 7/181
                                                348/139
(Continued)

FOREIGN PATENT DOCUMENTS

EP    1 835 439 A1    9/2007
JP    H07-002022 A    1/1995
(Continued)

OTHER PUBLICATIONS

International Search Report with English translation and Written Opinion issued in corresponding application No. PCT/JP2016/073029 dated Nov. 15, 2016.
(Continued)

*Primary Examiner* — Tom Y Lu
(74) *Attorney, Agent, or Firm* — Foley & Lardner LLP

(57) ABSTRACT

Provided is a periphery recognition device that makes it possible to: minimize the load from object recognition processing for recognizing an object moving between one region covered by a long-distance sensor and/or a wide-angle short-distance sensor to another such region; the periphery recognition device being able to reduce the proportion of non-recognition or erroneous recognition of objects moving from a region covered by the long-distance sensor or the wide-angle short-distance sensor to a boundary region. There is provided a first sensor 11*a*, a second sensor 11*b*, a long-distance object recognition unit 13 for recognizing an object present in a long-distance area on the basis of three-dimensional long-distance data calculated on the
(Continued)

basis of situation data acquired using the first sensor 11*a*, a short-distance object recognition unit 14 for recognizing an object present in a wide-angle and short-distance area on the basis of three-dimensional wide-angle short-distance data calculated on the basis of situation data acquired using the second sensor 11*b*, and a feedback unit 15 for transferring information relating to the objects between the long-distance object recognition unit 13 and the short-distance object recognition unit 14.

7 Claims, 10 Drawing Sheets

(51) Int. Cl.
| | |
|---|---|
| *G01C 3/06* | (2006.01) |
| *G08G 1/16* | (2006.01) |
| *G06T 7/593* | (2017.01) |
| *G06T 7/70* | (2017.01) |
| *G01C 3/08* | (2006.01) |
| *G01C 11/02* | (2006.01) |
| *G01C 21/26* | (2006.01) |
| *G06K 9/20* | (2006.01) |

(52) U.S. Cl.
CPC ....... *G01C 21/265* (2013.01); *G06K 9/00201* (2013.01); *G06K 9/209* (2013.01); *G06T 1/00* (2013.01); *G06T 7/593* (2017.01); *G06T 7/70* (2017.01); *G08G 1/16* (2013.01); *G06T 2207/10012* (2013.01); *G06T 2207/30252* (2013.01)

(58) Field of Classification Search
CPC ...... G06K 9/00791; G06K 9/209; G06T 1/00; G06T 2207/10012; G06T 2207/30252; G06T 7/593; G06T 7/70; G08G 1/01
See application file for complete search history.

(56) References Cited

U.S. PATENT DOCUMENTS

| | | |
|---|---|---|
| 2005/0278088 A1 | 12/2005 | Thorner |
| 2010/0283837 A1* | 11/2010 | Oohchida .............. G02B 1/005 |
| | | 348/47 |
| 2012/0177285 A1 | 7/2012 | Tsurube |
| 2016/0335892 A1* | 11/2016 | Okada ....................... B60T 7/22 |
| 2017/0273161 A1* | 9/2017 | Nakamura ......... H05B 37/0227 |
| 2018/0150949 A1* | 5/2018 | Matono .................... G01C 3/06 |
| 2018/0370566 A1* | 12/2018 | Kojo ...................... B60R 21/00 |

FOREIGN PATENT DOCUMENTS

| | | |
|---|---|---|
| JP | H11-039596 A | 2/1999 |
| JP | 2011-121398 A | 6/2011 |
| JP | 2012-103109 A | 5/2012 |
| JP | 2012-163495 A | 8/2012 |
| WO | WO-2014/054752 A1 | 4/2014 |

OTHER PUBLICATIONS

Franke et al., "Intelligent Vehicle Technologies: Theory and Applications, From door to door—principles and applications of computer vision for driver assistant systems", Jan. 1, 2001, Intelligent Vehicle Technologies: Theory and Applications, Butterworth-Heinemann, Oxford [U.A.] pp. 131-188.

Supplementary Partial European Search Report issued in corresponding European Patent Application No. EP 16850901 dated Apr. 24, 2019.

Office Action received in corresponding Japanese Patent Application No. 2015-191331, dated Aug. 13, 2019 with English translation.

Supplementary European Search Report issued in corresponding European Patent Application No. 16850901.6 dated Jul. 12, 2019.

\* cited by examiner

FIG. 4
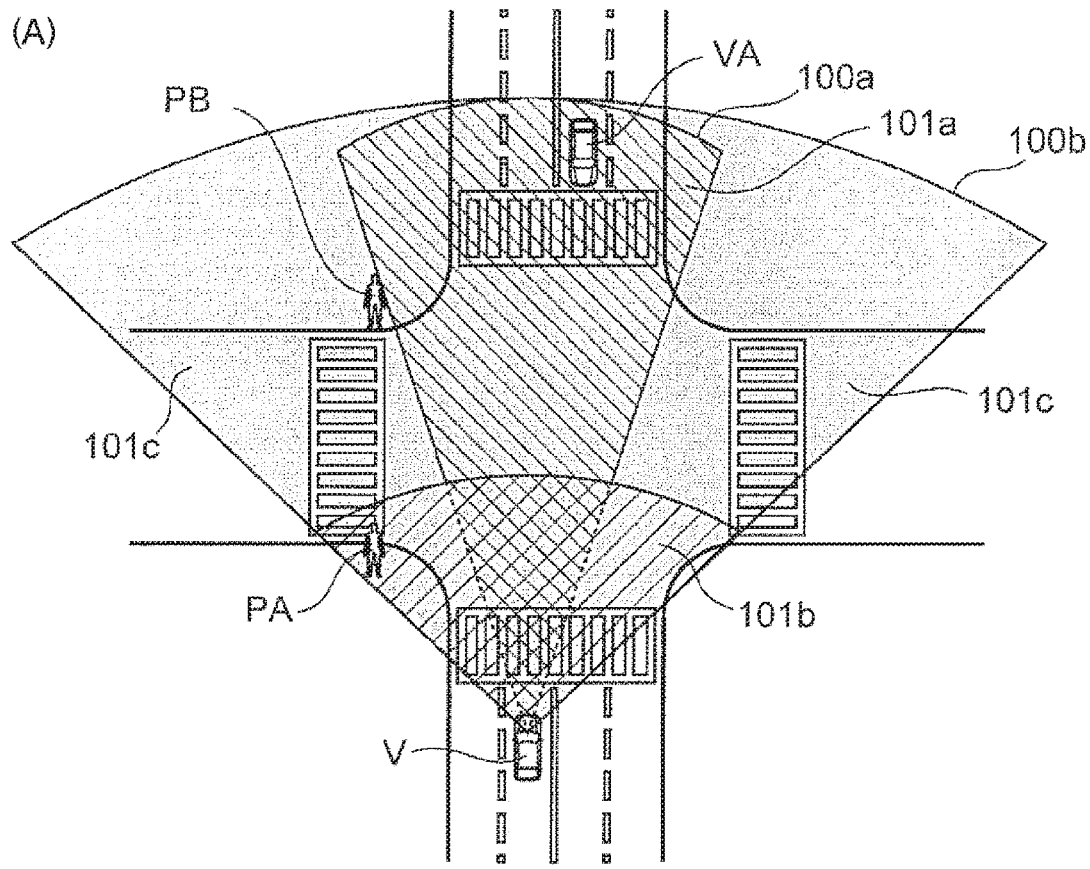
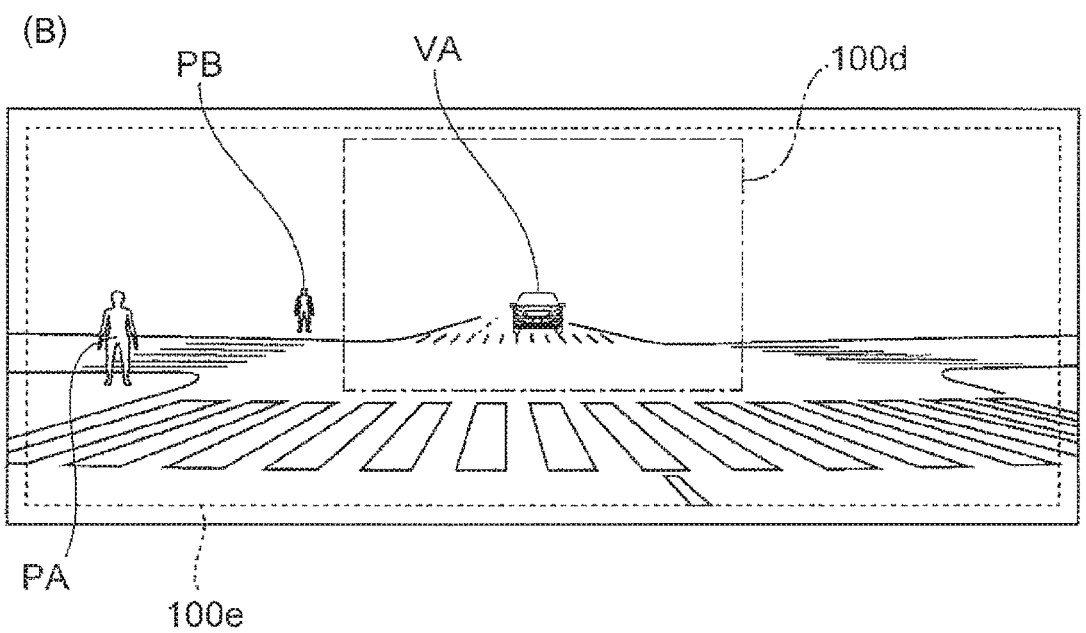

PERIPHERY RECOGNITION DEVICE

TECHNICAL FIELD

The present invention relates to a periphery recognition device, and more particularly to a periphery recognition device that is suitably attached to a sensor for long-distance detection and a sensor for wide-angle and short-distance detection.

BACKGROUND ART

In recent years, an image processing device that detects a solid object (three-dimensional object) by utilizing a stereo camera has been used.

The image processing device is used in applications for monitoring systems that detect invasions of suspicious individuals and other abnormalities and onboard systems that support safe driving of cars.

In onboard environment, it is necessary to implement detection and distance measurement of an object and find out a safe steering method in advance in order to satisfy a requirement of an application for detecting a vehicle, a pedestrian, and an object positioned on a front side, for example.

In an image processing apparatus disclosed in PTL 1, a plurality of cameras are used and distances from the cameras to objects present in a long-distance area and a short-distance area are detected by combining distance images regarding long and short distances, and a scale of hardware or software is reduced through a solid object detection function that uses the combined distance image.

CITATION LIST

Patent Literature

PTL 1: Japanese Patent Application Laid-Open No. 2012-103109

SUMMARY OF INVENTION

Technical Problem

In the above-described conventional technique for recognizing a type (kind) of a detected object; however, when an object moves from a region covered by a long-distance camera to a region covered by a short-distance camera, or moves in the opposite direction thereof, it is necessary to perform perfect object recognition with respect to a candidate object entering that region, and a load of object recognition processing increases. In addition, the measurement accuracy generally decreases in a boundary region, and thus, there is a problem of an increase in proportion of non-recognition or erroneous recognition of the object that has moved to the boundary region from the region covered by the long-distance camera or the short-distance camera.

The present invention has been made in view of the above-described problems, and an object thereof is to provide a periphery recognition device that makes it possible to: minimize a load from object recognition processing for recognizing an object moving between one region covered by a long-distance sensor and/or a wide-angle short-distance sensor to another such region; and reduce the proportion of non-recognition or erroneous recognition of an object moving from the region covered by the long-distance sensor or the wide-angle short-distance sensor to a boundary region.

Solution to Problem

In order to solve the above-described problems, the periphery recognition device according to the present invention includes: a first sensor that is configured to acquire situation data of a long-distance area; a second sensor that has a detection region having a wider angle than the first sensor and is configured to acquire situation data of a short-distance area in the detection region; a long-distance object recognition unit that recognizes an object present in the long-distance area based on three-dimensional long-distance data calculated based on the situation data acquired by the first sensor; a short-distance object recognition unit that recognizes an object present in a wide-angle and short-distance area based on three-dimensional wide-angle short-distance data calculated based on the situation data acquired by the second sensor; and an information linkage unit that transfers information relating to the object between the long-distance object recognition unit and the short-distance object recognition unit.

In addition, the periphery recognition device according to the present invention includes: a sensor that is configured to acquire situation data outside a vehicle; and an object recognition unit that detects and recognizes an object based on the situation data acquired by the sensor. The object recognition unit specifies a relatively-moving body relatively moving from a recognizable region where it is possible to detect and recognize the object to a detectable region where it is possible to detect the object but difficult to recognize the object based on a recognition result in the recognizable region.

Advantageous Effects of Invention

According to the periphery recognition device of the present invention, it is possible to minimize the load from the object recognition processing for recognizing the object moving between one region covered by the first sensor for long distance and/or the second sensor for wide angle and short distance to another such region, and further, it is possible to reduce the proportion of non-recognition or erroneous recognition of the object moving from one (recognizable region) of the regions covered by the first sensor for long distance and the second sensor for wide angle and short distance to the boundary region (detectable region).

Other objects, configurations, and effects which have not been described above become apparent from embodiments to be described hereinafter.

BRIEF DESCRIPTION OF DRAWINGS

FIG. 4 is a view illustrating a situation where a vehicle equipped with the periphery recognition device illustrated in FIG. 1 is at an intersection, in which (A) is an overhead view thereof, and (B) is a view illustrating a scene ahead of the vehicle.

DESCRIPTION OF EMBODIMENTS

Hereinafter, embodiments of a periphery recognition device according to the present invention will be described with reference to the drawings. Hereinafter, the description will be given regarding a case where a first sensor for long-distance detection and a second sensor for wide-angle and short-distance detection are constituted by a stereo camera device provided with a pair of onboard cameras including a camera suitable for long-distance detection and a camera suitable for wide-angle and short-distance detection. However, it is a matter of course that the first sensor and the second sensor may be constituted, for example, by a detection device including a radar, an ultrasonic sensor, and the like.

First Embodiment

Figure 1:
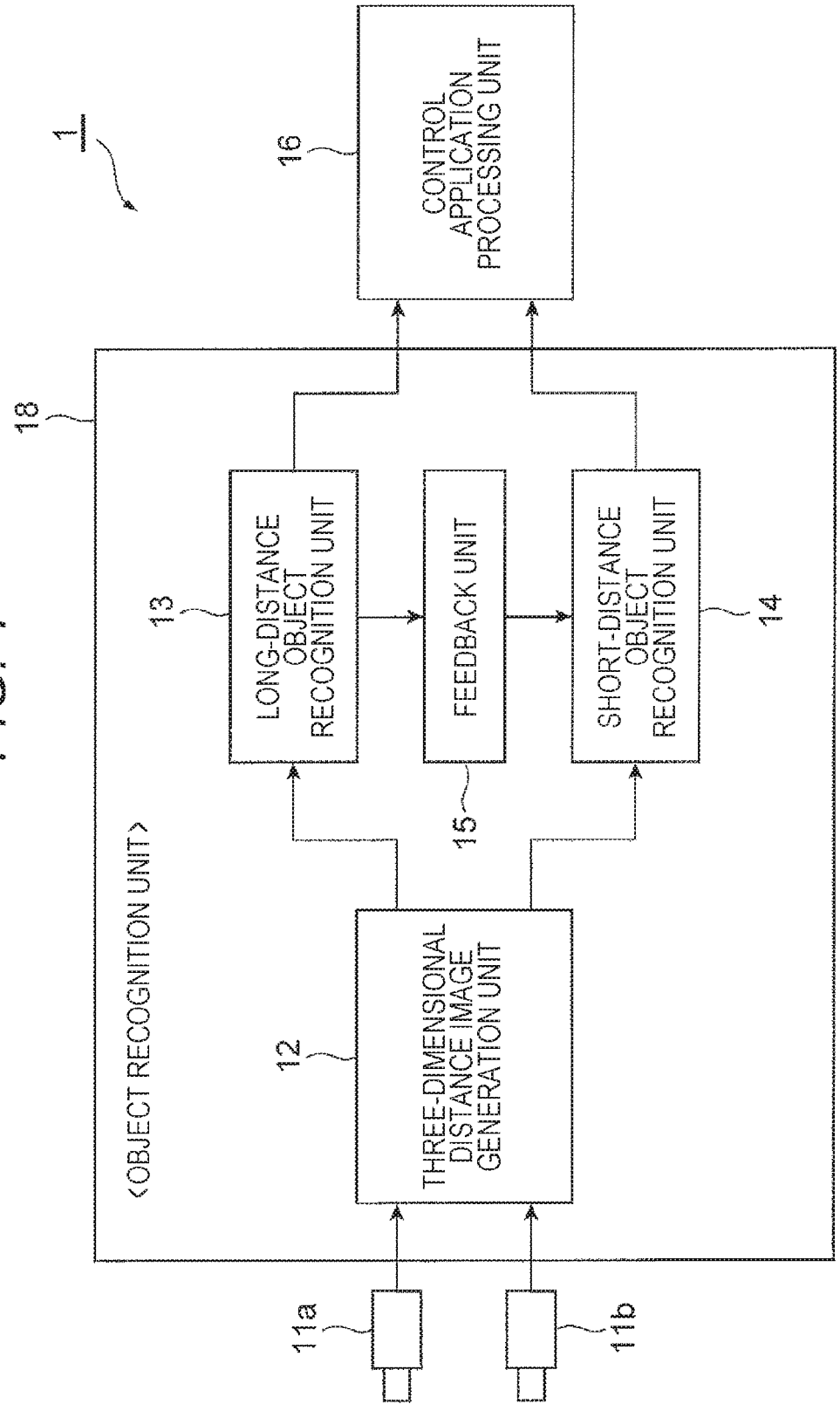
FIG. 1 is a block diagram illustrating an internal configuration of a first embodiment of a periphery recognition device according to the present invention.

FIG. 1 is a block diagram illustrating an internal configuration of a first embodiment of a periphery recognition device according to the present invention.

As illustrated in the drawing, a periphery recognition device 1 of the present embodiment basically includes two cameras (sensors) 11a and 11b installed at the same height, an object recognition unit 18 including a three-dimensional distance image generation unit 12, a long-distance object recognition unit 13, a short-distance object recognition unit 14, and a feedback unit (information linkage unit) 15, and a control application processing unit 16.

Figure 2:
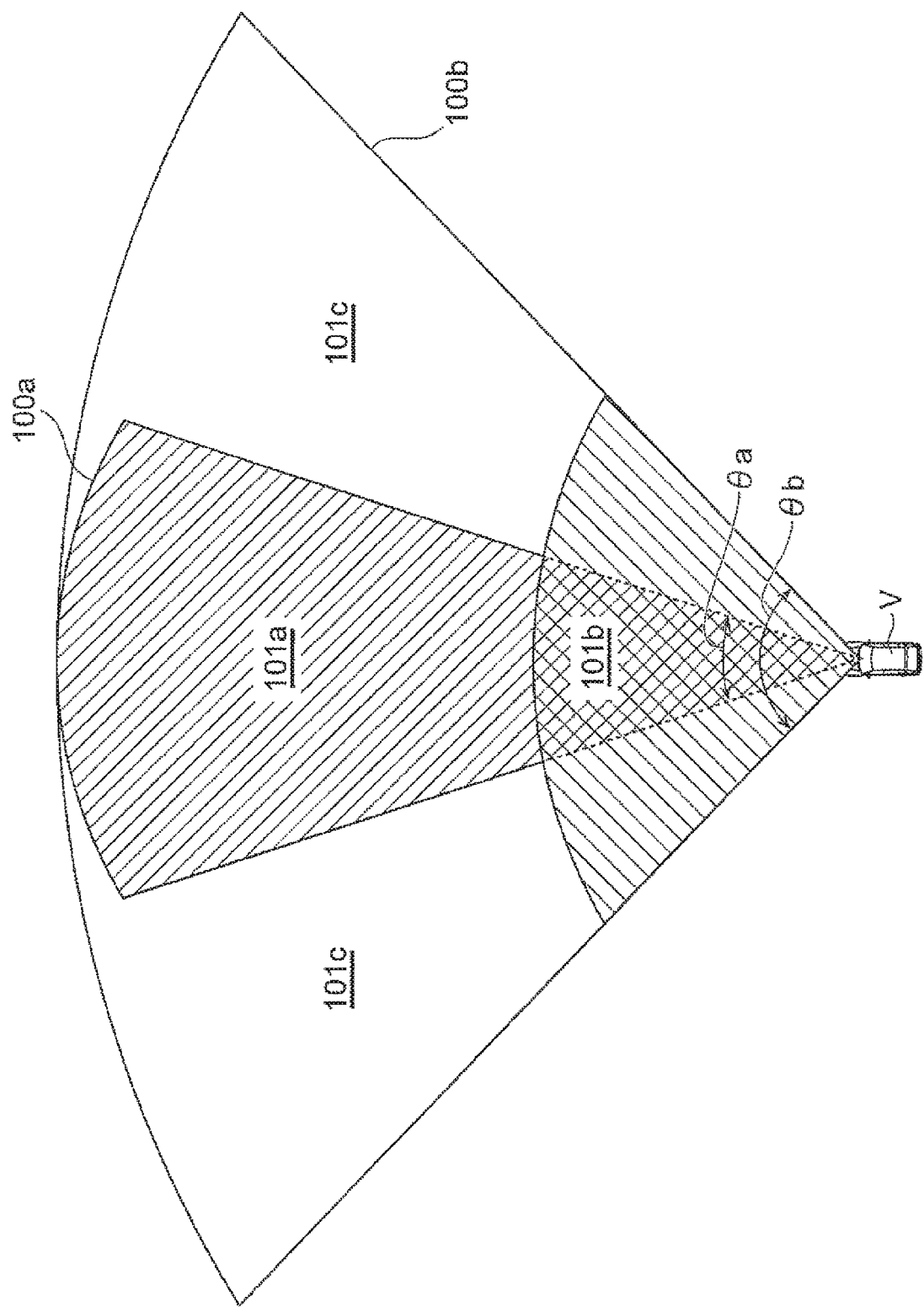
FIG. 2 is a plan view illustrating a detection region covered by each camera illustrated in FIG. 1.

The two cameras 11a and 11b are arranged at approximately the same position of a vehicle, for example, toward a front side of the vehicle in order to acquire situation data outside the vehicle, the camera 11a is suitable for long-distance detection (that is, a camera that can acquire situation data of an object or the like present in a long-distance area with high accuracy), and the camera 11b is suitable for wide-angle and short-distance detection (that is, a camera that has a wider-angle field of view (detection region) as compared with the camera 11a and can acquire situation data of an object or the like present in a wide-angle and short-distance area with high accuracy) (see FIG. 2).

The three-dimensional distance image generation unit 12 functions as a three-dimensional data generation unit that calculates three-dimensional long-distance data based on the situation data obtained by the camera (first sensor) 11a and calculates three-dimensional wide-angle short-distance data based on the situation data obtained by the camera (second sensor) 11b.

Specifically, the three-dimensional distance image generation unit 12 performs stereo matching using image signals received from the cameras 11a and 11b and creates a three-dimensional distance image for a long distance relating to a region 100d illustrated in FIG. 4(B) and a three-dimensional distance image for a wide angle and a near distance relating to a region 100e illustrated in FIG. 4(B). In this stereo matching, a unit image that minimizes a difference between the image signals is determined among unit images each of which is set in advance for two images compared with each other. That is, a region where the same object is projected is detected. Accordingly, the three-dimensional distance image for a long distance and the three-dimensional distance image for a wide angle and a short distance are formed. Incidentally, the three-dimensional distance image is an image having a value of a distance from the camera to the object in real environment. In addition, the three-dimensional distance image generation unit 12 creates the image (long-distance image) for the long distance relating to the region 100d illustrated in FIG. 4(B) and the image (short-distance image) for a wide angle and a short distance relating to the region 100e illustrated in FIG. 4(B).

The long-distance object recognition unit 13 functions as a first object recognition unit that recognizes an object present in a long-distance area as a first region, and recognizes a solid object in an image based on the three-dimensional distance image and the long-distance image (three-dimensional long-distance data) for the long distance created by the three-dimensional distance image generation unit 12. Next, the long-distance object recognition unit 13 transmits information on the recognized solid object to the feedback unit 15.

The feedback unit 15 functions as the information linkage unit that transfers information relating to the object between the long-distance object recognition unit 13 and the short-distance object recognition unit 14. Here, the feedback unit 15 records the information on the solid object recognized by the long-distance object recognition unit 13 and transmits the stored information on the solid object to the short-distance object recognition unit 14.

Figure 3:
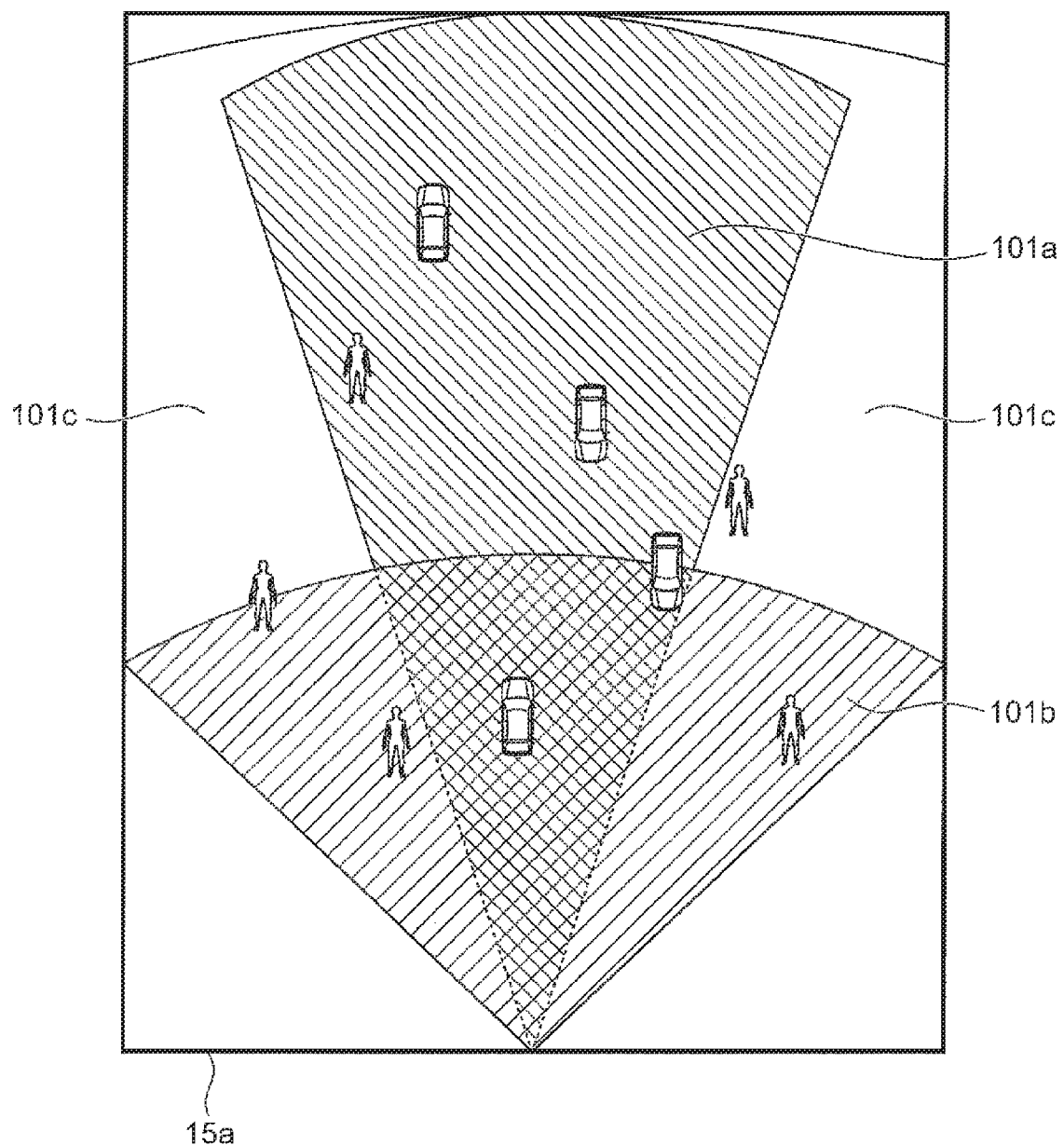
FIG. 3 is a view illustrating an overview of a solid object map.

In this case, the feedback unit 15 can include a solid object map 15a which indicates at least a type of the solid object and a current position and speed of the three-dimensional object in the real environment as illustrated in FIG. 3, in order to record object recognition information created by the long-distance object recognition unit 13 and the short-distance object recognition unit 14.

The short-distance object recognition unit 14 functions as a second object recognition unit that recognizes an object present in a wide-angle and short-distance area as a second region, different from the first region, and detects an object present in a detectable region (to be described later) as a third region, different from the first region and the second region, and recognizes a solid object in an image based on the three-dimensional distance image and the short-distance image (three-dimensional wide-angle short-distance data) for the short distance created by the three-dimensional distance image generation unit 12. Next, the short-distance object recognition unit 14 reads the information on the recognized solid object transmitted by the feedback unit 15.

The control application processing unit 16 determines a control application (control operation) to be executed by the vehicle on which the periphery recognition device 1 is mounted in accordance with the solid object recognized by the long-distance object recognition unit 13 and the short-distance object recognition unit 14.

Next, a case where the periphery recognition device 1 is applied as a system configured to monitor the surroundings of the vehicle will be described in more detail with reference to FIGS. 2 and 4 to 6.

FIG. 2 illustrates each field of view (detection regions 100*a* and 100*b*) of the cameras 11*a* and 11*b* mounted on a vehicle V. The camera 11*a* has the detection region 100*a* at a viewing angle θa, and a region (region apart from the vehicle V by a predetermined distance) 101*a* outside the detection region 100*a* is set to a long-distance "recognizable region" (first region). In addition, the camera 11*b* has the detection region 100*b* at a viewing angle θb (>θa), a region (region within a predetermined distance from the vehicle V) 101*b* inside the detection region 100*b* is set to a wide-angle and short-distance "recognizable region" (second region), and a region (region apart from the vehicle V by the predetermined distance) outside the detection region 100*b*, particularly, a lateral region 101*c* of the long-distance "recognizable region" 101*a* thereof is set to the "detectable region (also referred to as a boundary region)" (third region).

In this specification, the term "recognizable" means to be capable of acquiring various types of information relating to an object, such as a type (a vehicle, a two-wheeled vehicle, a bicycle, a pedestrian, a guardrail, a signal, a utility pole, or the like) of the object (solid object), a position of the object, and speed of the object, and the term "detectable" means to be capable of acquiring information such as a position of an object and speed of the object although information relating to, for example, a type of the object (solid object) cannot be acquired. That is, measurement accuracy is lower in the above-described "detectable region" 101*c* than in the wide-angle and short-distance "recognizable region" 101*b*, and thus, there is a possibility that the object recognition becomes difficult in the "detectable region" 101*c*.

FIG. 4 illustrates a situation where the vehicle V equipped with the periphery recognition device 1 illustrated in FIG. 1 is at an intersection.

FIG. 4(A) is an overhead view when a pedestrian PA, a pedestrian PB, and a vehicle VA are in the field of view of (the cameras 11*a* and 11*b* of) the periphery recognition device 1. Here, FIG. 4(A) illustrates a state where the vehicle VA is in the long-distance "recognizable region" 101*a*, the pedestrian PA is in the wide-angle and short-distance "recognizable region" 101*b*, and the pedestrian PB has moved from the long-distance "recognizable region" 101*a* and is in the "detectable region" 101*c*.

In addition, FIG. 4(B) illustrates a state obtained by displaying the above-described situation by images acquired by the cameras 11*a* and 11*b*, the region 100*d* is a region covered by the long-distance "recognizable region" 101*a*, and the region 100*e* corresponds to a region covered by the wide-angle and short-distance "recognizable region" 101*b* and the "detectable region" 101*c*. As described above, the pedestrian PA in the region 100*e* is in the wide-angle and short-distance "recognizable region", and thus, is recognizable as a pedestrian. However, the pedestrian PB in the region 100*e* is in the "detectable region", and thus, there is a possibility that it is difficult to recognize whether the pedestrian PB is a pedestrian only with the information obtained from the camera 11*b*.

Figure 5:
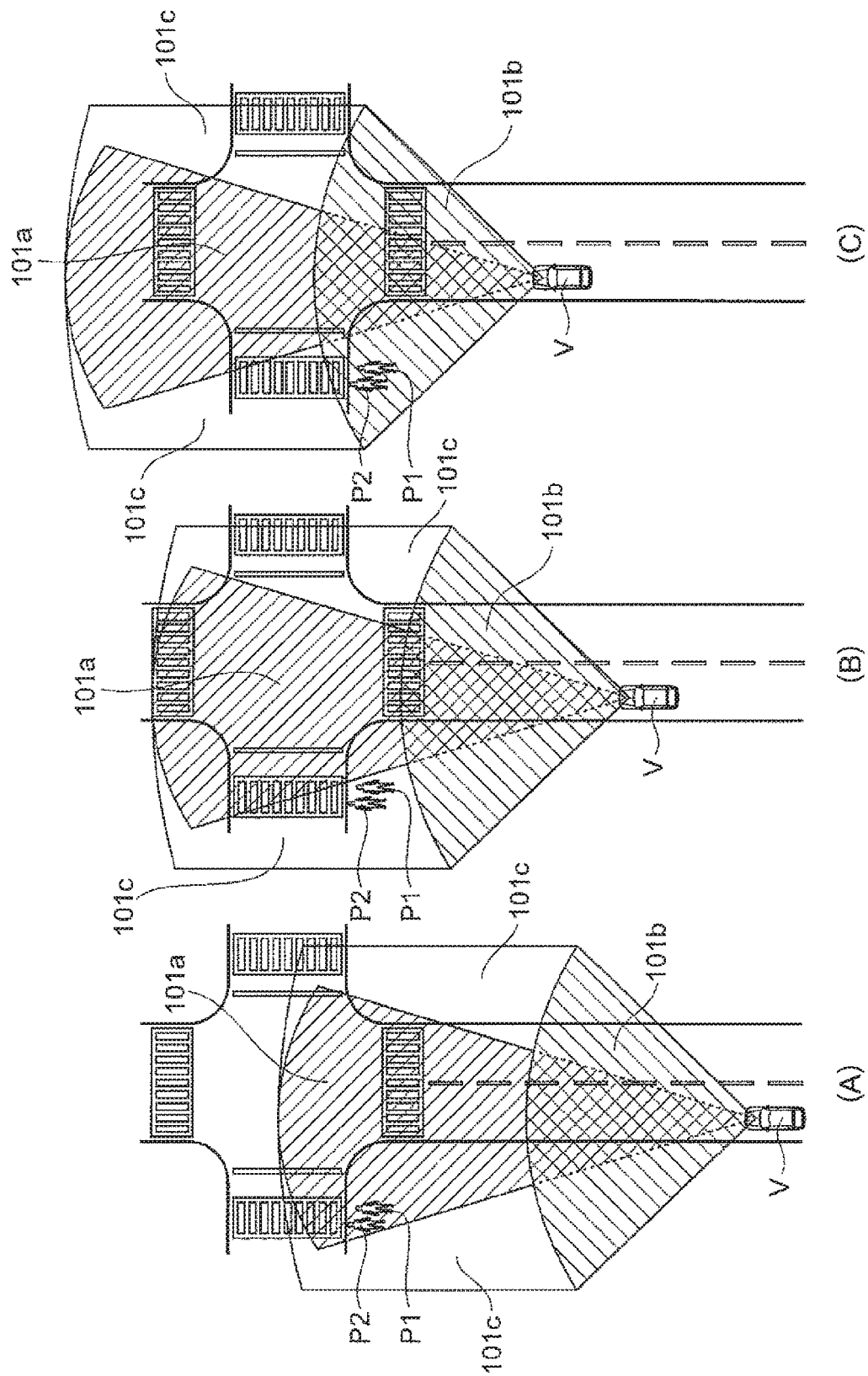
FIG. 5 is an overhead view sequentially illustrating a situation where the vehicle equipped with the periphery recognition device illustrated in FIG. 1 enters an intersection, in which (A) is a view illustrating a situation where a pedestrian is included in a long-distance recognizable region, (B) is a view illustrating a situation where a pedestrian is included in a detectable region, and (C) is a view illustrating a situation where a pedestrian is included in a short-distance recognizable region.

FIG. 5 sequentially illustrates a situation where the vehicle V equipped with the periphery recognition device 1 illustrated in FIG. 1 enters an intersection.

As illustrated in FIG. 5(A), pedestrians P1 and P2 (relatively-moving bodies which are objects that relatively move with respect to the vehicle V) enter the long-distance "recognizable region" 101*a* as the vehicle V approaches the intersection, and thus, the pedestrians P1 and P2 are recognized by the long-distance object recognition unit 13 (according to a flow illustrated in FIG. 6 to be described later), and solid object information (information relating to the solid object) as a recognition result is recorded in the feedback unit 15.

Next, the pedestrians P1 and P2 move from the long-distance "recognizable region" 101*a* and reach the "detectable region" 101*c* when the vehicle V continues to move toward the intersection as illustrated in FIG. 5(B). Here, the short-distance object recognition unit 14 estimates the current position of the solid object recorded by the long-distance object recognition unit 13 using the solid object information transmitted from the feedback unit 15, and collates this estimation result with a result of the object detection processing step S3 illustrated in FIG. 6 to be described later, thereby calculating the solid object information on the pedestrians P1 and P2.

Figure 6:
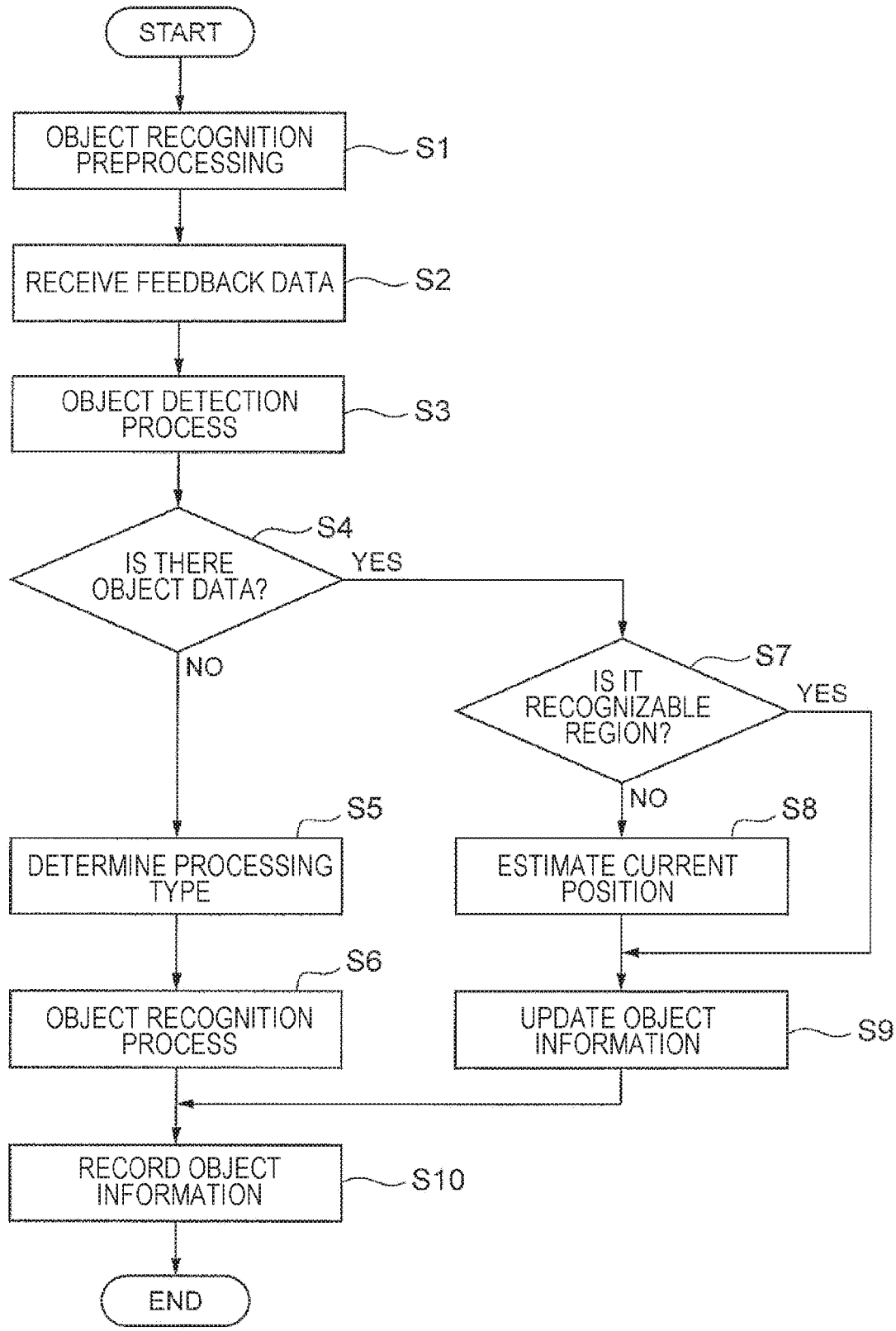
FIG. 6 is a flowchart describing object recognition processing performed by the periphery recognition device illustrated in FIG. 1.

Next, when the pedestrians P1 and P2 move from the long-distance "recognizable region" 101*a* and reach the wide-angle and short-distance "recognizable region" 101*b* as illustrated in FIG. 5(C), the short-distance object recognition unit 14 calculates the solid object information on the pedestrians P1 and P2 using the solid object information transmitted from the feedback unit 15 and the result of the object detection processing step S3 illustrated in FIG. 6 to be described later.

FIG. 6 is a flowchart describing object recognition processing performed by the periphery recognition device 1 illustrated in FIG. 1, and particularly, a process executed by each of the long-distance object recognition unit 13 and the short-distance object recognition unit 14.

First, the three-dimensional distance image and a region image corresponding to each other generated by the three-dimensional distance image generation unit 12 are processed in an object recognition preprocessing step S1. Incidentally, a conventionally-known method can be applied in this processing method, and thus, a detailed description thereof will be omitted here.

Next, the solid object information transmitted by the feedback unit 15 is read out if readable in a feedback data receiving step S2, and a position in the real environment of the solid object as a candidate is calculated in the object detection processing step S3.

Next, whether the solid object information relating to the solid object as the candidate is included in the solid object information transmitted by the feedback unit 15 is determined in an object data presence confirming step S4. When it is determined that such information is not included, a type (kind) of object recognition processing that needs to be executed based on characteristics of the solid object as the candidate is determined in a processing type determination step S5, and recognition processing determined in the processing type determination step S5 is executed to generate solid object information including at least a type, a current position, and speed of the solid object in an object recognition processing step S6.

On the other hand, when it is determined that the solid object information on the solid object as the candidate is included in the solid object information transmitted by the feedback unit 15 in the object data presence confirming step S4, whether the solid object as the candidate is in the "recognizable region" is determined in a recognizable test step S7. When it is determined to be in the "recognizable region", the solid object information is generated using the solid object information transmitted from the feedback unit 15 and the result of the object detection processing step S3 (the position in the real environment of the solid object) in an object information updating step S9.

On the other hand, when it is determined that the solid object as the candidate is not in the "recognizable region" in the recognizable test step S7, a current position of the solid object whose information is included in the information transmitted from the feedback unit 15 is calculated in a current position estimation step S8, this calculation result is collated with the result of the object detection processing step S3 (the position in the real environment of the solid object), and the solid object information is generated using the solid information transmitted from the feedback unit 15 and the result of the object detection processing step S3 in the object information updating step S9.

Then, the solid object information generated in the object recognition processing step S6 or the object information updating step S9 is recorded in the feedback unit 15 in an object information recording step S10.

In this manner, the first object recognition unit that recognizes the object present in the first region and the second object recognition unit that recognizes the object present in the second region different from the first region and detects the object present in the third region different from the first region and the second region are provided, and the information linkage unit (feedback unit) transfers the information relating to the object between the first object recognition unit and the second object recognition unit according to the periphery recognition device 1 of the present embodiment. Specifically, the feedback unit 15 is configured to transfer the information relating to the object between the long-distance object recognition unit 13 and the short-distance object recognition unit 14, the information to be transmitted includes the object recognition information created by the long-distance object recognition unit 13 and the short-distance object recognition unit 14, and the object recognition information to be transmitted is used to determine whether the object has moved from one of the regions 101a and 101b (see FIG. 2) covered by the respective cameras (the first sensor and the second sensor) 11a and 11b to the other region. The object is recognized based on the object recognition information to be transmitted, and thus, it is possible to minimize a processing load from one or both of the long-distance object recognition unit 13 and the short-distance object recognition unit 14 (in the first embodiment, the short-distance object recognition unit 14).

In addition, the object recognition information created by the long-distance object recognition unit 13 and the short-distance object recognition unit 14 is recorded in the feedback unit 15, and thus, this object recognition information is used to recognize an object that has moved from one of the regions 101a and 101b (see FIG. 2, the "recognizable region") covered by the respective cameras (the first sensor and the second sensor) 11a and 11b and is present in the region 101c (see FIG. 2, the "detectable region") therebetween. Thus, it is possible to reduce the proportion of non-recognition or erroneous recognition of an object having moved from the "recognizable region" and reached the "detectable region".

That is, with such configuration and operation of the periphery recognition device 1 according to the first embodiment, it is possible to minimize the load from the short-distance object recognition unit 14 when the object (relatively-moving object) has moved from the long-distance "recognizable region" and reached the short-distance "recognizable region", and it is possible to reduce the proportion of non-recognition or erroneous recognition of the object (relatively-moving body) that has moved from the long-distance "recognizable region" and reached the "detectable region".

Second Embodiment

Figure 7:
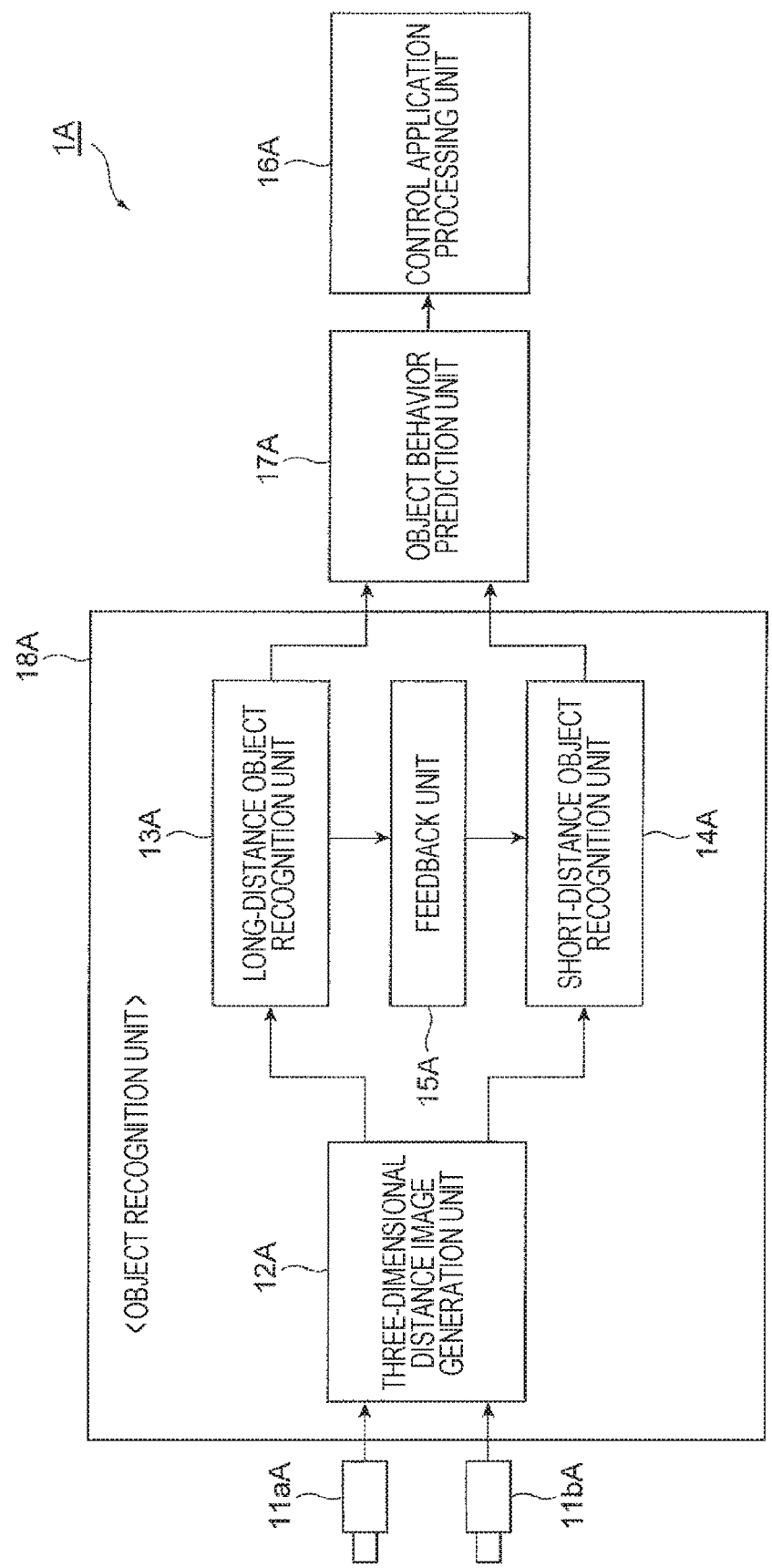
FIG. 7 is a block diagram illustrating an internal configuration of a second embodiment of a periphery recognition device according to the present invention.

FIG. 7 is a block diagram illustrating an internal configuration of a second embodiment of a periphery recognition device according to the present invention.

A periphery recognition device 1A of the second embodiment illustrated in FIG. 7 is different from the periphery recognition device 1 of the first embodiment illustrated in FIG. 1 only in terms that an object behavior prediction unit 17A is provided, and the other configurations are substantially the same. Therefore, the same reference numerals are given to the same configurations as those of the periphery recognition device 1 of the first embodiment, and a detailed description thereof will be omitted. Hereinafter, the object behavior prediction unit 17A, which is the difference, will be mainly described.

The object behavior prediction unit 17A calculates a prediction value of a path in the real environment that an object is planned to follow in the future according to characteristics of the object obtained from solid object information (including at least a type, a current position, and speed of the solid object) generated by one or both of a long-distance object recognition unit 13A and a short-distance object recognition unit 14A.

A control application processing unit 16A determines a control application (control operation) to be executed by a vehicle on which the periphery recognition device 1A is mounted in accordance with the solid object recognized by the long-distance object recognition unit 13A and the short-distance object recognition unit 14A and a behavior of the object predicted by the object behavior prediction unit 17A.

Next, a case where the periphery recognition device 1A is applied as a system configured to monitor the surroundings of the vehicle will be described in more detail with reference to FIG. 8.

Figure 8:
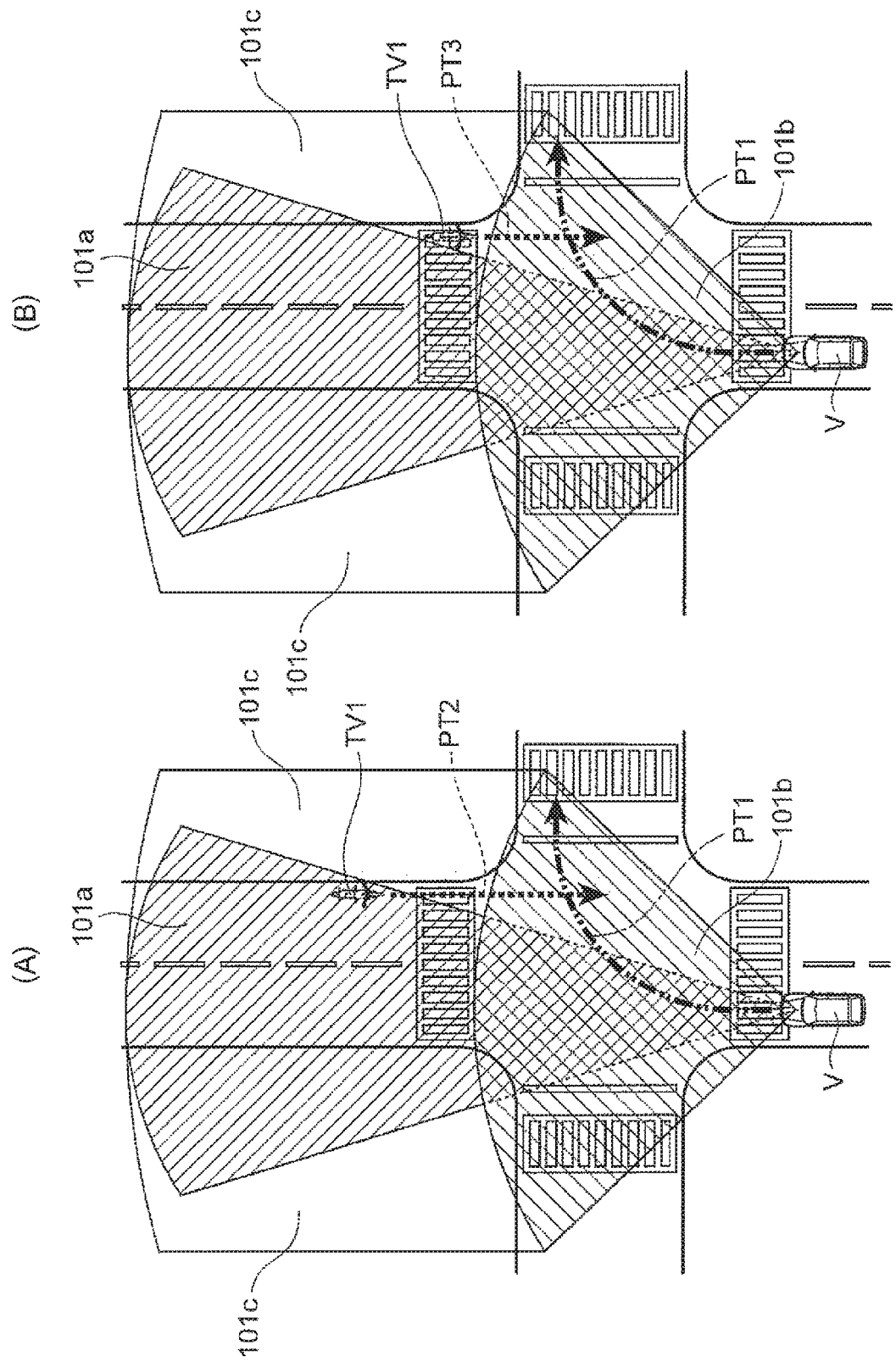
FIG. 8 is an overhead view illustrating a situation where a vehicle equipped with the periphery recognition device illustrated in FIG. 7 is at an intersection, in which (A) is a view illustrating a situation where a two-wheeled vehicle is included in a long-distance recognizable region, and (B) is a view illustrating a situation where a two-wheeled vehicle is included in a detectable region.

FIG. 8 illustrates a situation where a vehicle V equipped with the periphery recognition device 1A illustrated in FIG. 7 is at an intersection and a driver of the vehicle V is to turn right following a path PT1.

As illustrated in FIG. 8(A), a two-wheeled vehicle TV1 (relatively-moving body) is recognized by the long-distance object recognition unit 13A in this situation, the solid object information generated in this manner is used by the object behavior prediction unit 17A in order to determine the control application to be executed by the vehicle V and to calculate a path PT2 of the solid object to be used by the control application processing unit 16A (in the illustrated example, a path along which the two-wheeled vehicle TV1 travels straight on the opposite lane).

In addition, when the two-wheeled vehicle TV1 has moved from the long-distance "recognizable region" 101a and reached the "detectable region" 101c as illustrated in FIG. 8(B), the short-distance object recognition unit 14A calculates the solid object information on the two-wheeled vehicle TV1 using the solid object information transmitted from a feedback unit 15A. Then, the solid object information generated in this manner is used by the object behavior prediction unit 17A in order to determine the control application to be executed by the vehicle V and to calculate a path PT3 of the solid object to be used by the control application processing unit 16A (in the illustrated example, a path along which the two-wheeled vehicle TV1 further travels straight).

In periphery recognition device 1A of the second embodiment as well, it is possible to reduce the proportion of non-recognition or erroneous recognition of the object (relatively-moving object) that has moved from the long-distance "recognizable region" and reached the "detectable region", similarly to the periphery recognition device 1 of the first embodiment described above.

Third Embodiment

Figure 9:
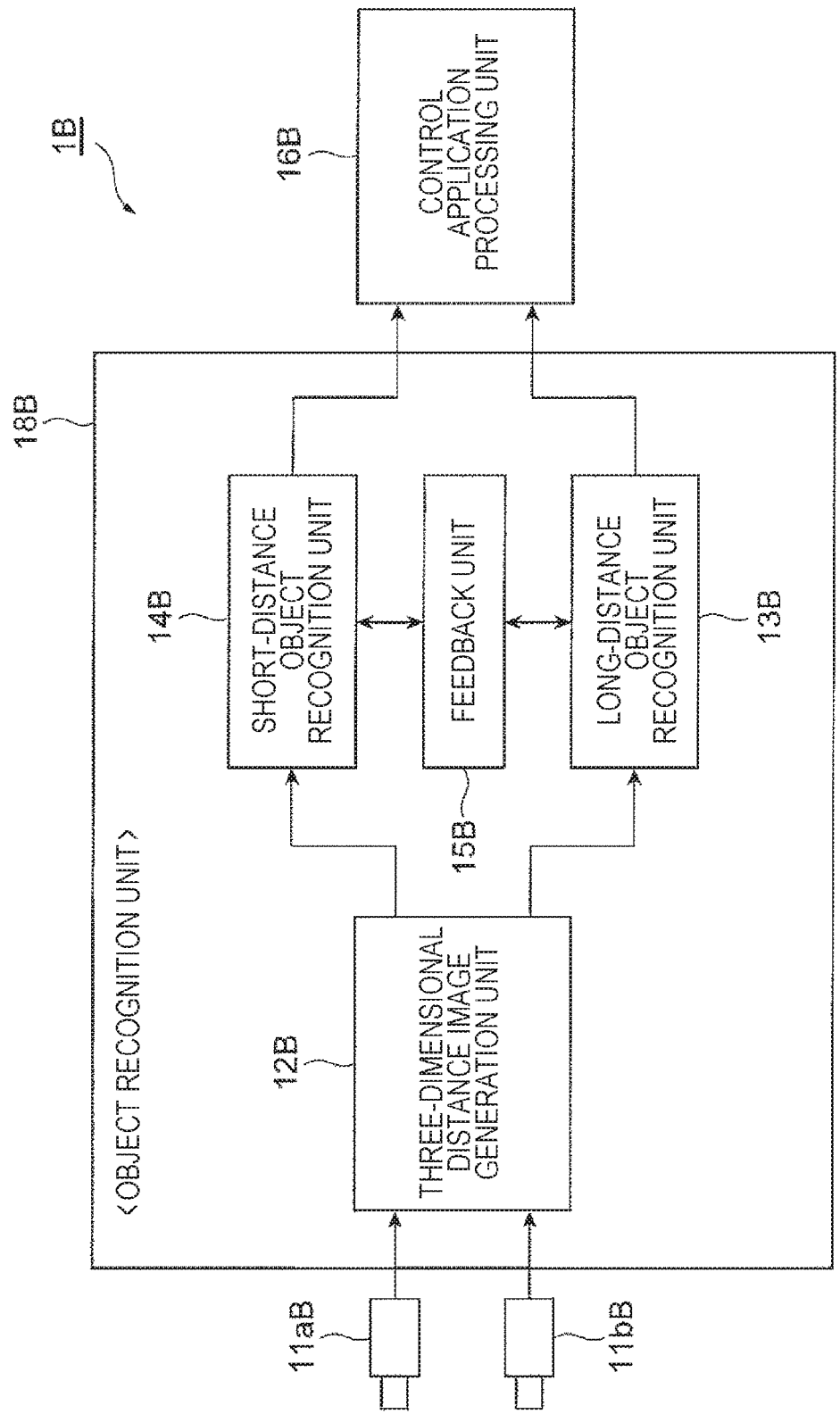
FIG. 9 is a block diagram illustrating an internal configuration of a third embodiment of a periphery recognition device according to the present invention.

FIG. 9 is a block diagram illustrating an internal configuration of a third embodiment of a periphery recognition device according to the present invention.

A periphery recognition device 1B of the third embodiment illustrated in FIG. 9 is different from the periphery recognition device 1 of the first embodiment illustrated in FIG. in terms that information is exchanged bidirectionally between a long-distance object recognition unit 13B and a feedback unit 15B and between a short-distance object recognition unit 14B and the feedback unit 15B, and the other configurations are substantially the same. Therefore, the same reference numerals are given to the same configurations as those of the periphery recognition device 1 of the first embodiment, and a detailed description thereof will be omitted. Hereinafter, the difference will be mainly described.

Specifically, in the periphery recognition device 1B according to the third embodiment, the short-distance object recognition unit 14B reads information on the recognized solid object from the feedback unit 15B or records the information in the feedback unit 15B, and uses the information for a process of recognizing a solid object based on a three-dimensional distance image and a short-distance image for a short distance created by a three-dimensional distance image generation unit 12B. Further, the long-distance object recognition unit 13B reads information on the recognized solid object from the feedback unit 15B or records the information in the feedback unit 15B, and uses the information for the process of recognizing a solid object based on a three-dimensional distance image and a long-distance image for a long distance created by a three-dimensional distance image generation unit 12B. In addition, the feedback unit 15B records the information on the solid object recognized by the short-distance object recognition unit 14B and the long-distance object recognition unit 13B and transmits the stored solid object information to the short-distance object recognition unit 14B and the long-distance object recognition unit 13B.

Next, a case where the periphery recognition device 1B is applied as a system configured to monitor the surroundings of the vehicle will be described in more detail with reference to FIG. 10.

Figure 10:
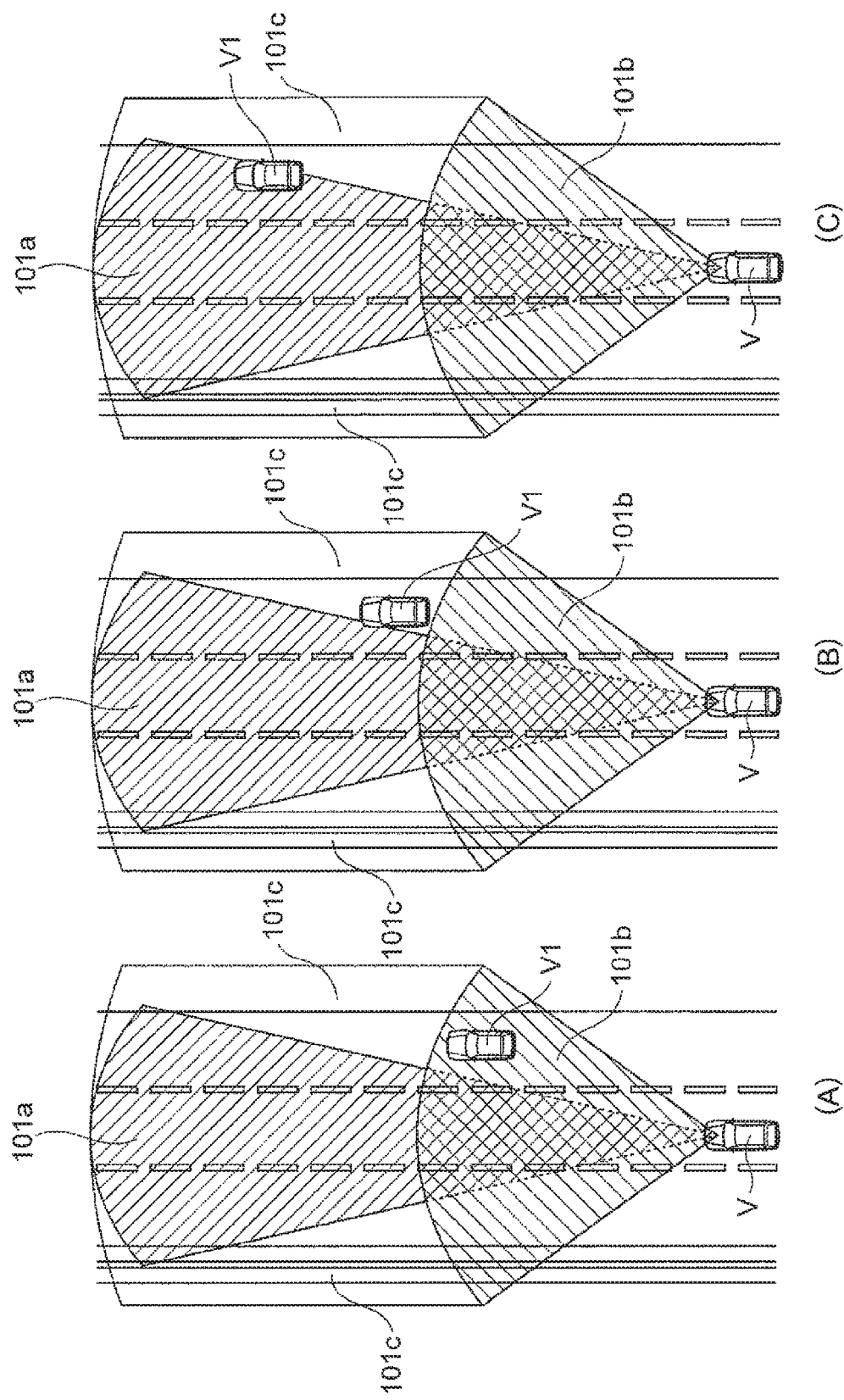
FIG. 10 is an overhead view sequentially illustrating a situation where a vehicle equipped with the periphery recognition device illustrated in FIG. 9 travels on an arterial road, in which (A) is a view illustrating a situation where a vehicle traveling in an overtaking lane is included in a short-distance recognizable region, (B) is a view illustrating a situation where a vehicle traveling in an overtaking lane is included in a detectable region, and (C) is a view illustrating a situation where a vehicle traveling in an overtaking lane is included in a long-distance recognizable region.

FIG. 10 sequentially illustrates a situation where the vehicle V equipped with the periphery recognition device 1B illustrated in FIG. 9 travels on an arterial road.

When a vehicle V1 (relatively-moving body) travels on an overtaking lane next to a lane on which the vehicle V travels (speed of the vehicle V1 is faster than speed of the vehicle V) as illustrated in FIG. 10(A), the vehicle V1 first enters the short-distance "recognizable region" 101b, and thus, the vehicle V1 is recognized (according to the flow illustrated in FIG. 6) by the short-distance object recognition unit 14B, and solid object information as a recognition result is recorded in the feedback unit 15B.

Next, when the vehicle 1 continues to move forward to move from the short-distance "recognizable region" 101b and reaches the "detectable region" 101c as illustrated in FIG. 10(B), the short-distance object recognition unit 14B estimates a current position of the solid object recorded by the short-distance object recognition unit 14B using the solid object information transmitted from the feedback unit 15B, and collates a result of the estimation with the result of the object detection processing step S3 illustrated in FIG. 6, thereby calculating the solid object information on the vehicle V1.

Next, when the vehicle V1 moves from the short-distance "recognizable region" 101b and reaches the long-distance "recognizable region" 101a as illustrated in FIG. 10(C), the long-distance object recognition unit 13B calculates the solid object information on the vehicle V1 using the solid object information transmitted from the feedback unit 15B and the result of the object detection processing step S3 illustrated in FIG. 6.

For example, when the speed of the vehicle V1 is slower than the speed of the vehicle V, and the vehicle V1 moves from the long-distance "recognizable region" 101a, passes through the "detectable region" 101c, and reaches the short-distance "recognizable region" 101b, the solid object information on the vehicle V1 is calculated in the same manner as in the first embodiment described above (that is, the solid object information generated by the long-distance object recognition unit 13B is handed over to the short-distance object recognition unit 14B).

In the periphery recognition device 1B of the third embodiment as well, it is possible to minimize the load from the long-distance object recognition unit 13B when the object (relatively-moving object) has moved from the short-distance "recognizable region" and reached the long-distance "recognizable region", and it is possible to reduce the proportion of non-recognition or erroneous recognition of the object (relatively-moving body) that has moved from the short-distance "recognizable region" and reached the "detectable region", similarly to the periphery recognition device 1 of the first embodiment described above.

In the first to third embodiments described above, the description has been given basically regarding the case where the object moves from the long-distance "recognizable region", passes through the "detectable region", and reaches the short-distance "recognizable region" and the solid object information generated by the long-distance object recognition unit is transmitted to the short-distance object recognition unit via the feedback unit, and the case where the object moves from the short-distance "recognizable region", passes through the "detectable region", and reaches the long-distance "recognizable region" and the solid object information generated by the short-distance object recognition unit is transmitted to the long-distance object recognition unit via the feedback unit. However, the solid object information generated by the long-distance object recognition unit may be input again to the long-distance object recognition unit from the feedback unit and used when the object moves from the long-distance "recognizable region", passes through the "detectable region", and enters the long-distance "recognizable region" again, and the solid object information generated by the short-distance object recognition unit may be input again to the short-distance object recognition unit from the feedback unit and used when the object moves from the short-distance "recognizable region", passes through the "detectable region", and enters the short-distance "recognizable region" again. In addition, it is obvious that the above-described effects of the present invention can be obtained as the solid object information generated by the long-distance object recognition unit is transmitted to the short-distance object recognition unit via the feedback unit even at a stage where the object has moved from the long-distance "recognizable region" and reached the "detectable region".

Incidentally, the present invention is not limited to the above-described first to third embodiments, and includes various modifications. For example, the above-described first to third embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be added to a configuration of a certain embodiment. In addition, addition, deletion or substitution of other configurations can be made with respect to some configurations of each embodiment.

Incidentally, the fact that the periphery recognition devices 1, 1A, and 1B include the recognizable region in which it is possible to detect and recognize the object and the detectable region in which it is possible to detect the object but it is difficult to recognize the object has been described in the above-described embodiments. In a general periphery recognition device, the recognition (or identification) is performed when an object is present in the recognizable region, but it is difficult to perform the recognition any longer once the object has moved to the detectable region. Here, the movement of the object may be caused by movement of the vehicle, by movement of the object, or by movement of both the vehicle and the object.

There is a case where such a relatively-moving body moves again to the recognizable region once after moving from the recognizable region to the detectable region, and there is a risk that the load of the recognition processing increases or a risk that recognition accuracy decreases by performing the recognition processing again when the relatively-moving body has moved again to the recognizable region. Thus, if past recognition results in the recognizable region can be used when the object has relatively moved to the detectable region from the recognizable region, it is possible to reduce the load of the recognition processing and improve the recognition accuracy.

In addition, as the periphery recognition device, it is possible to consider the configuration in which the sensor that is configured to acquire situation data outside the vehicle and the object recognition unit that detects and recognizes the object based on the situation data acquired by the sensor are provided, and the object recognition unit specifies the relatively-moving body relatively moving from the recognizable region (first or second region) where it is possible to detect and recognize the object to the detectable region (third region) where it is possible to detect the object but difficult to recognize the object based on the recognition result in the recognizable region (first or second region). This configuration is not limited to the periphery recognition device having the plurality of sensors as in the above-described embodiments, but can be also applied to a device having only one sensor.

In addition, a part or all of each of the above-described configurations, functions, processing units, processing means, and the like may be realized, for example, by hardware by designing with an integrated circuit and the like. In addition, each of the above-described configurations, functions, and the like may also be realized by software by causing a processor to interpret and execute a program for realizing each of the functions. Information such as programs, tables, and files that realize the respective functions can be installed in a storage device such as a memory, a hard disk, and a solid state drive (SSD), or a storage medium such as an IC card, an SD card, and a DVD.

In addition, only a control line and an information line considered to be necessary for the description have been illustrated, and all control lines and information lines required as a product are not illustrated. It may be considered that most of the configurations are practically connected to each other.

REFERENCE SIGNS LIST 1 periphery recognition device
11a camera (first sensor)
11b camera (second sensor)
12 three-dimensional distance image generation unit
13 long-distance object recognition unit
14 short-distance object recognition unit
15 feedback unit (information linkage unit)
15a solid object map
16 control application processing unit
100a detection region of camera 11a
100b detection region of camera 11b
101a long-distance recognizable region (first region)
101b wide-angle and short-distance recognizable region (second region)
101c detectable region (third region)

The invention claimed is:
1. A periphery recognition device comprising:
a first sensor that is configured to acquire situation data of a long-distance area;
a second sensor that has a detection region having a wider angle than the first sensor and is configured to acquire situation data of a short-distance area in the detection region;
a long-distance object recognition unit configured to recognize an object present in the long-distance area based on three-dimensional long-distance data calculated based on the situation data acquired by the first sensor, wherein recognizing the object includes determining a type of the object;
a short-distance object recognition unit configured to recognize the object present in the short-distance area based on three-dimensional wide-angle short-distance data calculated based on the situation data acquired by the second sensor, wherein recognizing the object includes determining a type of the object; and
an information linkage unit configured to transfer information indicating the type of the object between the long-distance object recognition unit and the short-distance object recognition unit, wherein at least one of the long-distance object recognition unit and the short-distance object recognition unit is configured to use the transferred information to estimate an object type of an object detected in an area outside of the long-distance area and outside of the short-distance area.

2. The periphery recognition device according to claim 1, wherein
the information linkage unit comprises a solid object map that is configured to record object recognition information created by the long-distance object recognition unit and the short-distance object recognition unit and indicates at least a type of a solid object, and a current position and speed in real environment of a three-dimensional object.

3. The periphery recognition device according to claim 1, wherein
the information linkage unit is configured to transfer the information indicating the type of the object from the long-distance object recognition unit to the short-distance object recognition unit.

4. The periphery recognition device according to claim 1, wherein
the first sensor and the second sensor in the periphery recognition device are constituted by a stereo camera device including a pair of cameras suitable for detection in a long distance and detection in a wide angle and a short distance, and
the periphery recognition device further comprises a three-dimensional distance image generation unit that performs stereo matching using an image signal received from the stereo camera device and creates a three-dimensional distance image for the long distance and a three-dimensional distance image for the wide angle and short distance.

5. The periphery recognition device according to claim 1, wherein
the first sensor and the second sensor are mounted on a vehicle.

6. The periphery recognition device according to claim 1, further comprising
a control application processing unit configured to determine a control operation to be executed by the vehicle on which the first sensor and the second sensor are mounted.

7. The periphery recognition device according to claim 1, wherein the transferred information corresponds to an earlier time, and the at least one of the long-distance object recognition unit and the short-distance object recognition unit is configured to use the transferred information to determine object information including at least one of the object type, the object position, and the object speed.

* * * * *